(12) United States Patent
Passaro

(10) Patent No.: US 6,825,831 B1
(45) Date of Patent: Nov. 30, 2004

(54) POSITION INDICATING DEVICE FOR HARSH ENVIRONMENTS

(75) Inventor: Richard M. Passaro, Fairfield, CT (US)

(73) Assignee: Measurement Systems, Inc., Fairfield, CT (US)

( * ) Notice: Subject to any disclaimer, the term of this patent is extended or adjusted under 35 U.S.C. 154(b) by 232 days.

(21) Appl. No.: 10/267,062

(22) Filed: Oct. 7, 2002

(51) Int. Cl.$^7$ ................................................ G09G 5/08
(52) U.S. Cl. ..................... 345/167; 345/156; 345/157
(58) Field of Search ................................ 345/156, 157, 345/158, 160, 161, 163, 164, 165, 166, 167, 168, 184; 74/471 XY; 273/148 B; 200/6 A; 33/1 M

(56) References Cited

U.S. PATENT DOCUMENTS

| | | | | |
|---|---|---|---|---|
| 4,939,508 A | * | 7/1990 | Lawrence et al. | 345/167 |
| 5,214,415 A | | 5/1993 | Pandolei | 340/709 |
| 5,248,961 A | * | 9/1993 | Fujii | 345/167 |
| 5,486,845 A | * | 1/1996 | Chait | 345/163 |
| 5,583,541 A | | 12/1996 | Solhjell | 345/163 |
| 5,850,142 A | | 12/1998 | Rountos et al. | 324/207.2 |
| 5,973,674 A | * | 10/1999 | Buecker | 345/166 |
| 6,072,469 A | * | 6/2000 | Chen et al. | 345/157 |
| 6,225,980 B1 | * | 5/2001 | Weiss et al. | 345/161 |
| 6,304,246 B1 | * | 10/2001 | Kuth et al. | 345/157 |
| 2002/0084986 A1 | * | 7/2002 | Armstrong | 345/163 |
| 2003/0160763 A1 | * | 8/2003 | Cheng et sl. | 345/163 |

FOREIGN PATENT DOCUMENTS

| | | |
|---|---|---|
| DE | 19736928 C1 | 8/1997 |
| JP | 2240716 | 9/1990 |

* cited by examiner

*Primary Examiner*—Xiao Wu
(74) *Attorney, Agent, or Firm*—Wiggin and Dana LLP; Gregory S. Rosenblatt; Michael K. Kinney

(57) ABSTRACT

An improved position indicating device is presented. The position indicating device includes a housing having a sealed compartment and an opened compartment. A trackball is located in the opened compartment. A plurality of drive tube assemblies are also located in the opened compartment for supporting a periphery of the trackball. In one embodiment, the plurality of drive tubes include an X-axis drive tube and a Y-axis drive tube. The X-axis drive tube and the Y-axis drive tube each have a sealed magnet assembly affixed thereto. The drive tube assemblies and sealed magnetic assemblies generate a north-to-south pole magnetic field angle as the drive tube rotate. The sealed compartment includes an X-axis angle sensor, an X-axis signal conditioner, a Y-axis magnetic angle sensor, and a Y-axis signal conditioner. The angle sensors and signal conditioners sense and measure the north-to-south pole magnetic field angle generated by the rotating drive assemblies and sealed magnetic assemblies. The sealed compartment also includes a processor. The processor is coupled to the angle sensors and the signal conditioners and determines a change in consecutive magnetic field angles. The processor translates the change into an indication of linear motion of the position indicating device. The processor formats the indication into a signal, which it then transmits to a host device such as an information processing device.

8 Claims, 5 Drawing Sheets

POSITION INDICATING DEVICE FOR HARSH ENVIRONMENTS

COPYRIGHT NOTICE

A portion of the disclosure of this patent document contains material that is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

BACKGROUND OF THE INVENTION

1. Field of the Invention

The present invention relates generally to a position indicating device for use with an information processing system such as a computer and, more particularly, to a position indicating device for use with an information processing system operating in harsh environmental conditions.

2. Description of Prior Art

It is well known for an information processing system such as, for example, a computer, to use one or more input devices such as, for example, a keyboard and a position indicating device. As referred to herein a position indicating device is a device operated by a user of the information processing system to identify a position of a cursor on a display device (e.g., a screen of a display monitor). The cursor is repositioned on the screen in relation to a distance and direction of movement of the position indicating device. Examples of such position indicating devices include a mouse, a pressure sensitive pad, a joy stick, a light pen, a roller ball or trackball, a slide-roller, and the like.

Position indicating devices typically include sensors and electronic circuits for translating linear motion of the devices (e.g., X-axis and Y-axis components of motion) into signals that are passed to the information processing system to change the position of the cursor on the screen. A perceived drawback of conventional position indicating devices is that accurate translation of the linear motion suffers when contaminants such as, for example, dirt, dust or liquids are present within the environment in which the information processing system is operating.

Efforts have been made to limit and/or eliminate adverse effects of such environmental contaminants. For example, U.S. Pat. No. 5,583,541, issued Dec. 10, 1996, to Erik Solhjell, discloses a mouse or track ball having a roller ball mounted within a housing and three free rollers in contact with an outer peripheral surface of the roller ball. A core of the roller ball includes a magnetic material. A pair of Hall effect sensors detect a changing magnetic force emitted from the core as the roller ball rotates. A comparator outputs a digital waveform corresponding to the changing magnetic force and representing the movement of the roller ball. Solhjell describes that the mouse can tolerate a certain amount of dust before experiencing translation problems due to resulting contamination of the roller ball. The disclosure of this U.S. patent is incorporated by reference herein in its entirety.

Similarly, Japanese patent document number JP 240716 A, published Sep. 25, 1990, discloses a track ball device having multipolar magnets attached at ends of rotary shafts. Hall elements located in proximity to the magnets detect magnetic flux changes as the magnets rotate by the Hall elements. The magnetic flux changes, in effect, produce a Sine curve representing track ball movement. These patent documents are seen to disclose conventional trackball and mouse devices that sense ball position magnetically to minimize an adverse impact on mechanical and optical sensing components caused by environmental conditions such as dust and dirt.

U.S. Pat. No. 5,214,415, issued May 25, 1993, to Richard Pandolei, discloses an electromagnetically shielded cursor control assembly. The assembly includes a pliable plastic seal to keep environmental contaminants such as dirt and water out of a housing having electrical components (e.g., ball motion sensors) and mechanical components (e.g., an electrically conductive rollerball) of the assembly stored therein. The disclosure of this U.S. patent is incorporated by reference herein in its entirety. German patent document number DE 197 36 928 C1, published Apr. 8, 1999, discloses a cordless mouse having a movement sensor, a processor and a transducer located within a hermetically sealed and sterilized housing. These patent documents are seen to describe sealing all mechanical and electrical components of the trackball devices in housings to minimize, or substantially eliminate contaminates entering the housing.

The inventor has realized a number of deficiencies in these techniques for attempting to protect a mouse or trackball device from harsh environmental conditions. For example, despite best efforts to maintain such conventional systems dust, dirt and other contaminates eventually invade the housing and/or compartment containing the mechanical and electrical components of the mouse.

Accordingly, a need exists for a position indicating device that reliably minimizes the effects of contamination of components of the position indicating device and for a device that can be decontaminated for continued dependable performance in harsh environmental conditions. One solution is proposed in commonly owned U.S. Pat. No. 5,850,142, issued Dec. 15, 1998, to Chris P. Rountos and Richard M. Passaro, which describes a magnetically actuated control device (e.g., joystick) for use in harsh environments. The disclosure of this U.S. patent is incorporated by reference herein in its entirety.

OBJECTS OF THE INVENTION

Accordingly, it is an object of the present invention to provide an improved position indicating device for use with an information processing system operating in harsh environmental conditions.

It is another object of the present invention to provide a position indicating device having mechanical components located within an opened compartment and electronic components located within a sealed compartment such that the electronic components are free of contamination from harsh environmental conditions while mechanical components, which may be exposed to contamination, can be readily removed from the opened compartment, decontaminated and returned to the opened compartment for continued operation of the position indicating device.

Further objects of this invention will become more apparent from a consideration of the drawings and ensuing description.

SUMMARY OF THE INVENTION

The above and other objects are achieved by an improved position indicating device. The position indicating device includes a housing having a sealed compartment and an opened compartment. A trackball is located in the opened compartment. A plurality of drive tube assemblies are also located in the opened compartment for supporting a periphery of the trackball. In one embodiment, the plurality of drive tubes include an X-axis drive tube and a Y-axis drive tube. The X-axis drive tube and the Y-axis drive tube each have a sealed magnet assembly affixed thereto. The drive tube assemblies and sealed magnetic assemblies generate a north-to-south pole magnetic field angle as the drive tube rotate. The sealed compartment includes an X-axis angle sensor, an X-axis signal conditioner, a Y-axis magnetic angle sensor, and a Y-axis signal conditioner. The angle sensors and signal conditioners sense and measure the north-to-south pole magnetic field angle generated by the rotating drive assemblies and sealed magnetic assemblies. The sealed compartment also includes a processor. The processor is coupled to the angle sensors and the signal conditioners and determines a change in consecutive magnetic field angles. The processor translates the change into an indication of linear motion of the position indicating device. The processor formats the indication into a signal, which it then transmits to a host device such as an information processing device.

In one embodiment, the trackball and the plurality of drive tube assemblies are components of a sub-chassis assembly that is installed in the opened compartment. In one embodiment, the position indicating device includes a cover removably mounted over and enclosing the opened compartment. When the cover is removed the sub-chassis assembly is removable from the opened compartment.

BRIEF DESCRIPTION OF THE DRAWINGS

The features and advantages of the present invention will be better understood when the Detailed Description of the Preferred Embodiments given below is considered in conjunction with the figures provided, wherein.

In these figures, like structures are assigned like reference numerals, but may not be referenced in the description for all figures.

DETAILED DESCRIPTION OF THE PREFERRED EMBODIMENTS

Figure 1:
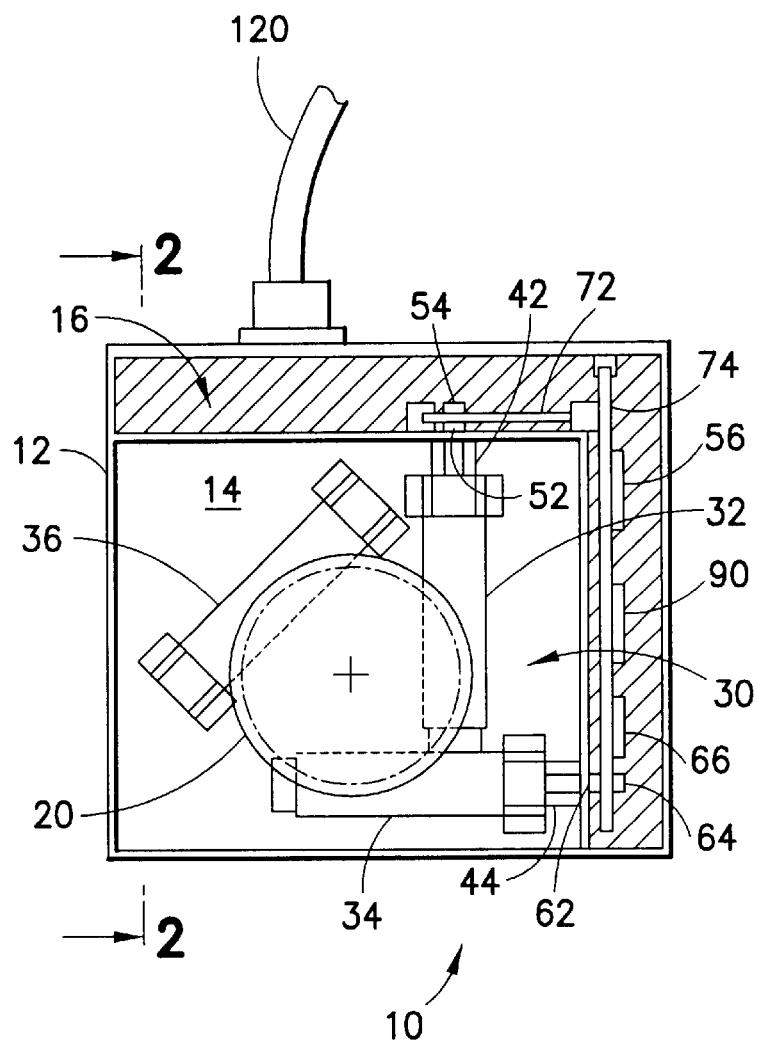
FIG. 1 is a plan view, in partial cross section, of a position indicating device configured and operating in accordance with one embodiment of the present invention.

FIG. 1 is a plan view, in partial cross section, of a position indicating device, shown generally at 10, configured and operating in accordance with the present invention for identifying a position of a cursor on a screen of a host device such as a computer (not shown). In accordance with the present invention, the position indicating device 10 includes a housing 12 having at least two compartments, an opened compartment, shown generally at 14, and a sealed compartment, shown generally at 16.

The opened compartment 14 includes a trackball 20 and a plurality of drive tube assemblies, shown generally at 30, supporting a periphery of the trackball 20. The drive tube assemblies 30 include an X-axis drive tube 32 and a Y-axis drive tube 34. In one embodiment, the drive tube assemblies 30 further include an idler drive tube 36. The X-axis drive tube 32 and the Y-axis drive tube 34 rotate in response to X-axis and Y-axis components of motion of the trackball 20.

The X-axis drive tube 32 and the Y-axis drive tube 34 each include a sealed magnet assembly 42 and 44, respectively, affixed thereto. The sealed magnet assemblies 42 and 44 generate north-to-south pole magnetic field angles (described in detail below) as the X-axis drive tube 32 and Y-axis drive tube 34 rotate.

The sealed compartment 16 includes an X-axis angle sensor 52, an X-axis signal conditioner 56, a Y-axis magnetic angle sensor 62, and a Y-axis signal conditioner 66 disposed on, for example, printed circuit boards (PCBs) 72 and 74 located within the sealed compartment 16. In one embodiment, a second X-axis angle sensor 54 and a second Y-axis angle sensor 64 are located on PCBs 72 and 74 (in proximity to the X-axis sensor 52 and Y-axis sensor 62, respectively) for redundancy. Such redundant sensors 54 and 64 being particularly useful in critical operating environments such as when the position indicating device 10 is implemented in a military application or extremely hazardous operating environment.

In accordance with the present invention, the X-axis and Y-axis electronic components (e.g., the angle sensors 52 and 62, and signal conditioners 56 and 66) cooperate to sense and measure the north-to-south pole magnetic field angles generated by rotation of the trackball 20. For example, rotation of the X-axis and Y-axis drive tubes 32 and 34 and corresponding magnetic assemblies 42 and 44 result in a detectable change in the angle of magnetic flux that is translated to determine the linear movement of the trackball 20. It should be appreciated that the magnetic assemblies 42 and 44 provide a sufficient magnetic field, e.g., at least about 100 kA/m (1250 gauss) to penetrate the sealed compartment 16 and excite the sensors 52 and 62. In one embodiment, the magnetic assemblies 42 and 44 include 8 mm×3 mm×7.5 mm samarium cobalt magnets that provide the aforementioned magnetic field at an air gap of about 0.034 to 0.25 inch. It should be appreciated that the air gap is a distance between the magnets in the assemblies and the magnetic angle sensors in the sealed compartment.

Figure 2:
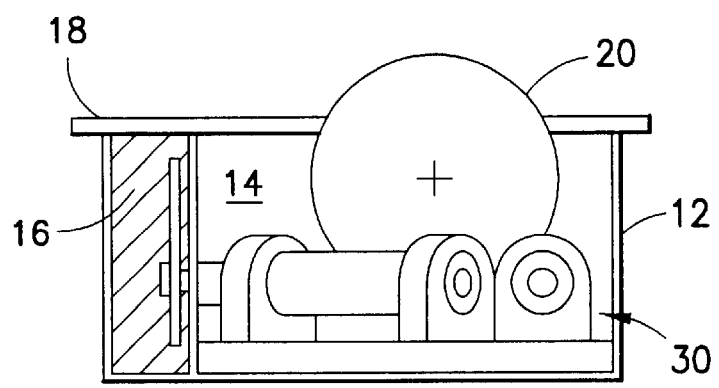
FIG. 2 is an elevational view in partial cross section of the position indicating device taken along line 2-2 of FIG. 1.

FIG. 2 is an elevational view in partial cross section of the position indicating device 10 taken along line 2-2 of FIG. 1. As shown in FIG. 2, the position indicating device 10 includes a removable top plate 18 that a user can remove to expose the opened compartment 14 and the contents thereof (e.g., the trackball 20 and drive tube assemblies 30). In accordance with the present invention, removal of the top plate 18 does not expose the sealed compartment 16. As shown in FIG. 2, the PCBs 72 and 74 are electrically coupled by a connector 76.

It should be appreciated that the top plate 18 may include one or more switch actuators or buttons (not shown) for invoking functions of the position indicating device such as selecting objects on the display screen, "drag and drop" functions, and the like as are generally known in the art. Each of the switch actuators includes a magnet, a spring and a button. A Hall effect switch integrated chip (IC) is magnetically coupled to each switch actuators. In accordance with the present invention, each of the Hall effect ICs is encapsulated (along with all other electronic components) within the sealed compartment 16 and communicates signals from the switch actuators to a processor (described below) for operation thereon.

Figure 3:
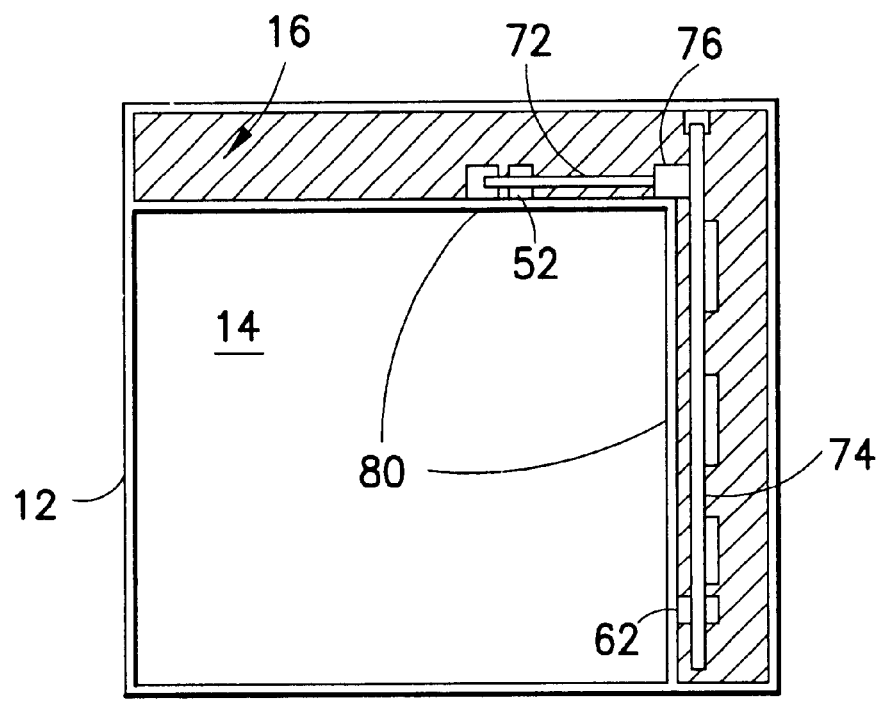
FIG. 3 is a top plan view, in partial cross section, of a housing of the position indicating device of FIG. 1.

FIG. 3 illustrates a top plan view, in partial cross section, of the housing 12 of the position indicating device 10. As shown in FIG. 3, the opened compartment 14 and the sealed compartment 16 are separated by a wall 80. Preferably, the wall is comprised of a non-ferrous material (e.g., aluminum, non-magnetic stainless steel (18-8 and 300 Series) and all plastics) such that the aforementioned magnetic field angles generated by the rotation of the drive tube assemblies 30 penetrate the sealed compartment 16. In one embodiment, where aggressive cleaning and decontamination agents are employed, the housing 12 and walls 80 are comprised of aluminum and stainless steel as the inventor has discovered that these material are better able to withstand these agents.

In one embodiment, the housing 12 is comprised of a single stainless steel body having a single opened compartment. The sealed compartment is formed by using temporary molding forms and pouring a plastic potting compound over the electronic components (e.g., the angle sensors, signal conditioners and the processor) disposed in a portion of the opened compartment. The temporary molding forms are then removed to provide the aforementioned sealed compartment 16 and opened compartment 14.

Figure 4:
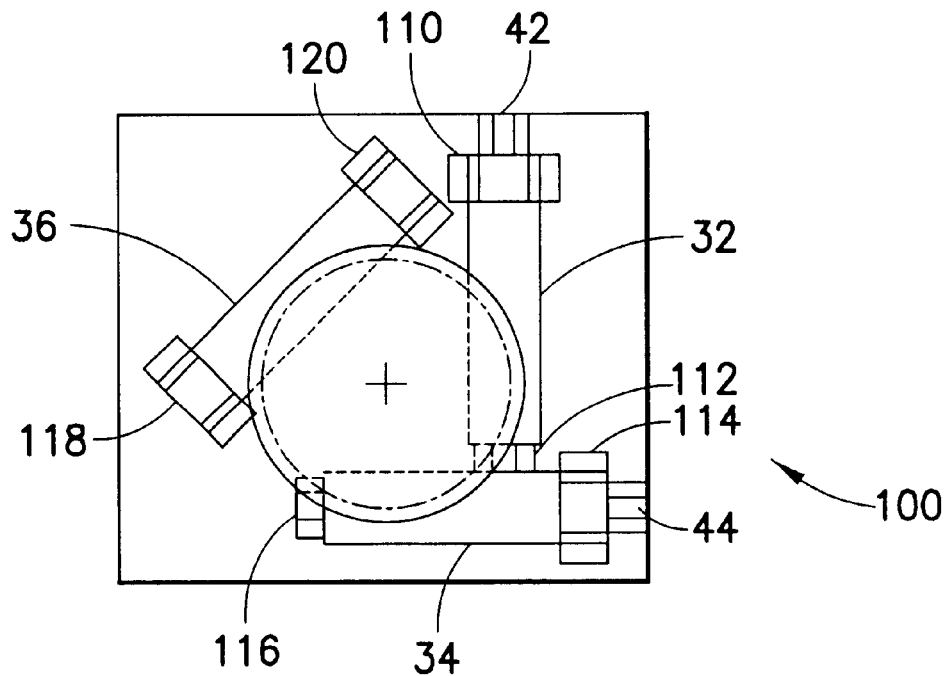
FIG. 4 is a top plan view of one embodiment of the present invention wherein mechanical components are implemented on a removable sub-chassis.

In one embodiment, illustrated in FIG. 4, the position indicating device 10 includes a sub-chassis, shown generally at 100. The sub-chassis 100 includes the trackball 20, the X-axis, Y-axis and idler drive tubes 32, 34 and 36, respectively, bearing assemblies 110–120 for supporting the drive tubes, and the sealed magnet assemblies 42 and 44. In one aspect of the present invention, the sub-chassis 100 is selectively installed within and removed from the opened compartment 14. For example, the top plate 18 is removed such that the sub-chassis 100 can be removed from the opened compartment 14. Preferably, the top plate 18 and the sub-chassis 100 can be removed and installed by a user without tools.

In one embodiment, after a period of time in which the position indicating device 10 has been exposed to harsh environmental condition (e.g., dirt, dust, flammable liquids, explosive gases and/or other contamination), the top plate 18 and sub-chassis 100 are removed. The sub-chassis 100 is decontaminated. After decontamination, the subchassis 100 is installed within the opened compartment 14 such that the position indicating device 10 can return to an operating mode. It should be appreciated that since the electronic components (e.g., angle sensors 52 and 62 and signal conditioners 56 and 66) are within the sealed compartment 16, the electronic components have not been contaminated. After decontamination of the mechanical components, the position indicating device 10 is returned to full operating mode.

Referring again to FIG. 1, the sealed component 16 includes a processor 90 located on the PCB 74. The processor 90 is electrically coupled to the X-axis and Y-axis angle sensors 52 and 62 and the X-axis and Y-axis signal conditioners 56 and 66. The processor 90 receives measurements of consecutive north-to-south pole magnetic field angles from the sensors 52 and 62 and conditioners 56 and 66 and determines a change in the consecutive magnetic field angles. The processor 90 includes processing algorithms (as described below) for translating the change in field angles into an indication of the linear motion of the position indicating device 10 (e.g., trackball 20). The processor 90 formats and transmits a message to an information processing device (e.g., a computer) coupled to the device 10 via cable 120 or other means of communication such as, for example, radio frequency or infrared communication signals.

In one embodiment, the electronic components (disposed in the sealed compartment 16) for detecting and measuring trackball motion include a microchip model PIC16F877 microcontroller of Microchip Technology (Chandler, Ariz.), two Philips Semiconductor (Eindhoven, Netherlands) model KMZ41 magnetoresistive sensors and two Philips Semiconductor model UZZ9001 signal conditioning microchips. The KMZ41 sensors and the UZZ9001 signal conditioning chip sets are capable of measuring the angle of magnetic flux between zero degrees (0°) and one hundred seventy-nine degrees (179°). The UZZ9001 signal conditioner resolves this measured angle into a 13-bit word of 8192 points. Angle measurements are made on the X and Y-axis components of trackball motion. Trackball X-axis and Y-axis counts are derived by continuously measuring the angle output data values provided by the UZZ9001 signal conditioning chips.

In one embodiment, angle data is sampled at a rate of about one thousand (1000) samples per second for both the X-axis and the Y-axis. This sample rate supports a maximum ball velocity greater than about fifteen (15) revolutions per second. The change in angle since the last angle measurement was made is accumulated along with the direction sign into trackball count data. The trackball count data is stored and formatted for serial transmission (e.g., over cable 120 or other communication means) to the information processing device coupled to the position indicating device 10. The inventor has observed that an angle measurement discontinuity occurs for an angle sampled beyond device full-scale angle limit of zero (0°) and one hundred seventy-nine degrees (179°). The dead area of this discontinuity is small in angle displacement so that no appreciable errors are introduced. In fact, the inventor has modified the microcontroller's algorithm to identify and correct this discontinuity.

Figures 5A, 5B:
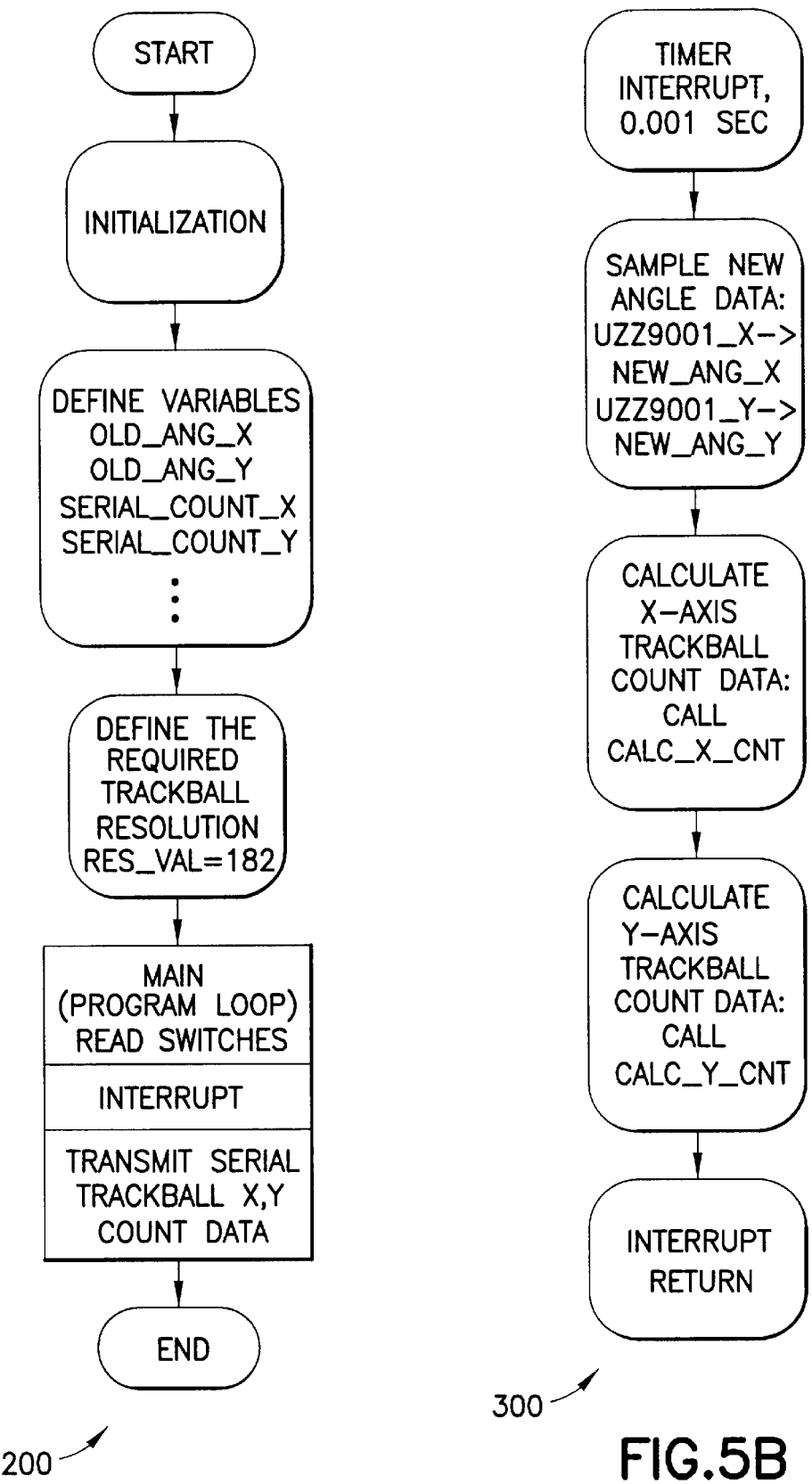
FIGS. 5A and 5B are flow charts of a main program algorithm and an interrupt driven routine for determining trackball counts from magnetic flux angle measurements in accordance with one embodiment of the present invention.

FIG. 5A depicts a main program algorithm 200 for determining trackball counts from angle measurements. FIG. 5B depicts an interrupt-driven routine 300 called by the main program 200. In one embodiment, the routine 300 is invoked by the interrupt of the main program 200 at predetermined periods of time, e.g., about every 0.001 sec.

Figure 6A:
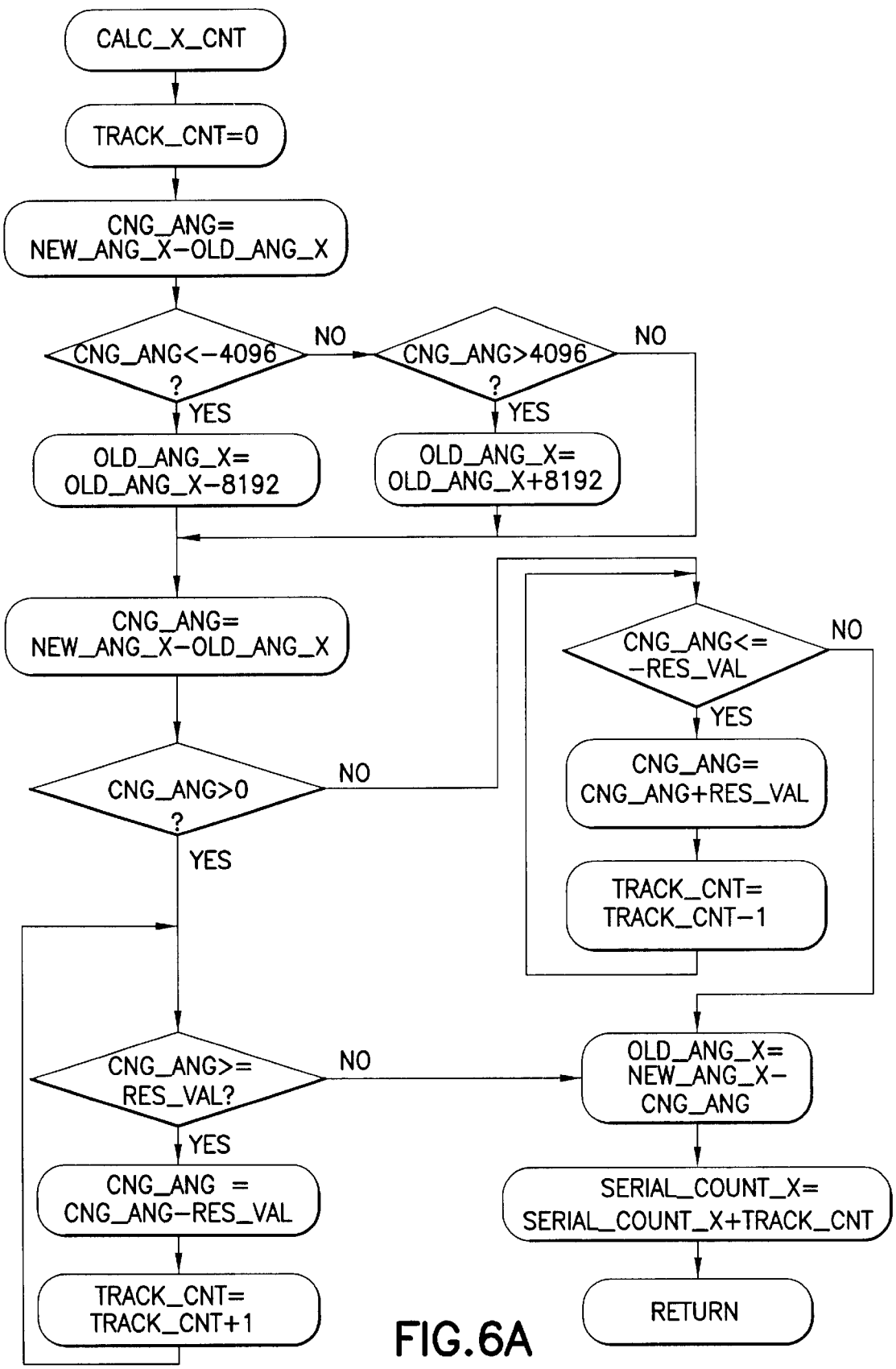
FIGS. 6A and 6B are flow charts of software routines for calculating X-axis and Y-axis serial count data in accordance with one embodiment of the present invention.
Figure 6B:
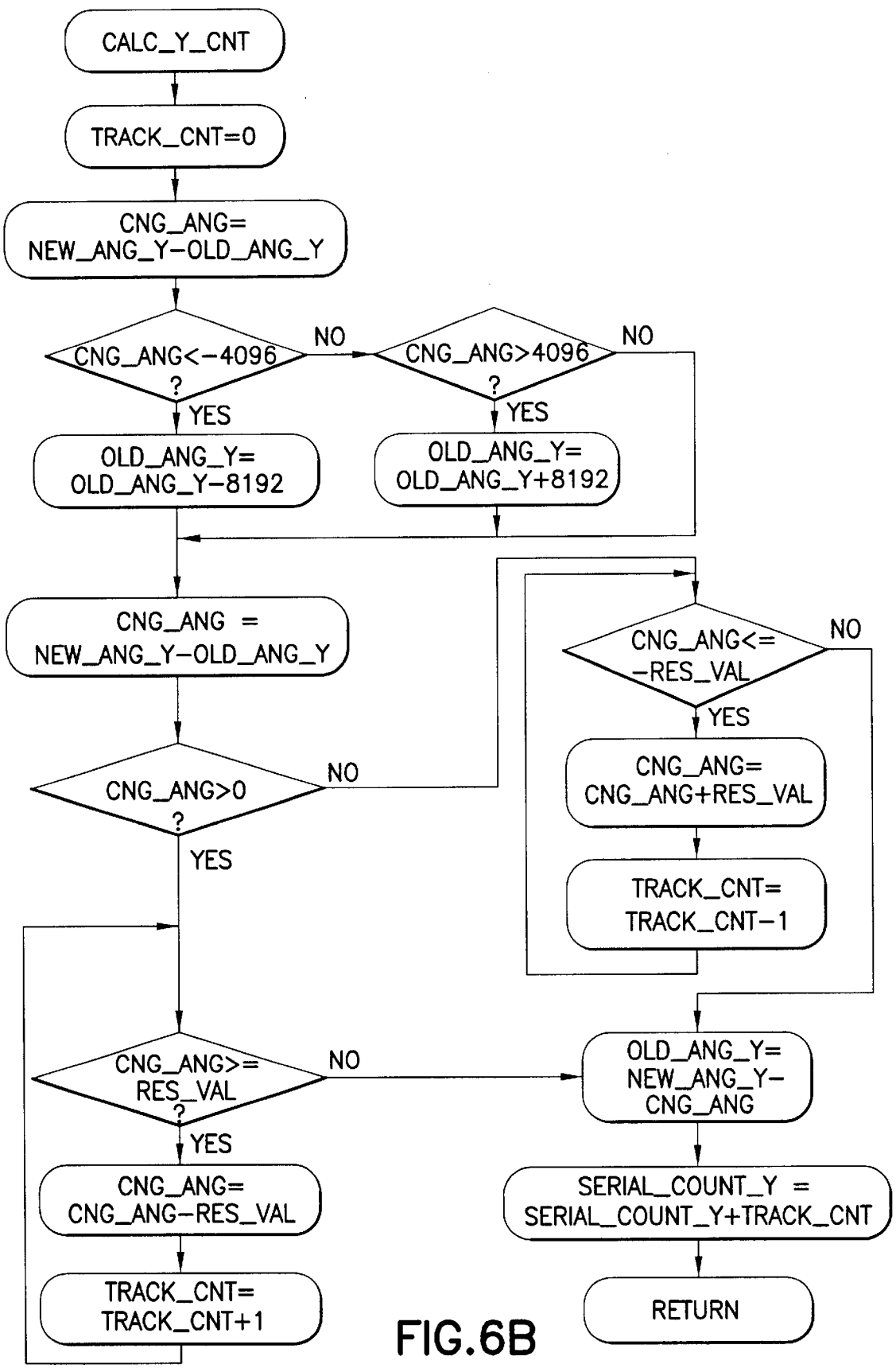

FIGS. 6A and 6B depict algorithms for calculating trackball X-axis and Y-axis serial count data using the UZZ9001 and KMZ41 chipset and a PIC16F877 microcontroller. The UZZ9001 and KMZ41 provide normal angle measurements between zero (0°) and one hundred seventy-nine degrees (179°) of angle, a discontinuity value, and then normal angle measurements through the next 0° to 179°-degree range. The algorithms accumulate the angle rotated and direction of rotation of the X-axis and Y-axis drive tubes 32 and 34, respectively.

One exemplary pseudo software code embodiment of the aforementioned algorithms (generalized by removing references to either the X-axis or the Y-axis) is included below wherein steps are illustrated that may be used in the process of acquiring valid angle values from each UZZ9001 signal conditioning chips and accumulating trackball counts for serial transmission.

Pseudo Code Example

Assuming a two inch (2") Diameter trackball and half inch (0.5") diameter drive tubes.

Trackball resolution required=360 counts per ball revolution. (e.g., See RES_VAL)

```
Variables:
OLD_ANG      = Previously sampled UZZ9001 angle data (16 bit, 2's complement)
NEW_ANG      = Latest sample of UZZ9001 angle data (16 bit, 2's complement)
CNG_ANG      = Change in angle (16 bit, 2's complement)
RES_VAL      = Trackball resolution angle (16 bit, 2's complement)
TRACK_CNT    = Current Trackball count (16 bit, 2's complement)
RES_VAL      = 182    ;(2" BALL/0.5" DRIVE TUBE) * (8192 COUNTS/180
                      ;DEGREES) = 182.044
                      ;UZZ9001 counts for each 1 degree of ball motion.
                      ;Set RES_VAL to 182 for 360 counts/Ball Rev
                      ;Set RES_VAL to 91 for 720 counts/Ball Rev.
                      ;Set RES_VAL to 364 for 180 counts/Ball Rev.
START: Sample the UZZ9001 angle data and save to NEW_ANG
                      ;Sample each trackball axis every
                      ;1 m Sec.
CNG_ANG      =    (NEW_ANG - OLD_ANG)
                      ;Handle discontinuity between 0 and
                      ;180 degree angle points
                      ;if it is found during this sample. It will always be
                      ;greater than 8192/2
IF CNG_ANG < -4096 THEN     ;The change from 180 degrees to 0 will be greater
                      ;than 8192/2
    OLD_ANG = (OLD_ANG - 8192)
END IF
IF CNG_ANG > 4096 THEN      ;The change from 0 to 180 degrees will be greater
                      ;than 8192/2
    OLD_ANG = (OLD_ANG + 8192)
END IF
CNG_ANG = (NEW_ANG - OLD_ANG)
                      ;Calculate the change in ball angle since the last
                      ;sample. Discontinuity has been accounted for
IF CNG_ANG > 0 THEN         ;Positive trackball direction
    IF CNG_ANG >= RES_VAL THEN
                      ;Test-was positive ball motion large enough to
                      ;output?
        WHILE CNG_ANG >= RES_VAL
                      ;Calculate the trackball counts, + direction
            CNG_ANG = (CNG_ANG - RES_VAL)
            TRACK_CNT = (TRACK_CNT + 1)
                      ;Add 1 trackball count in positive direction
        END WHILE
    OLD_ANG = (NEW_ANG - CNG_ANG)
                      ;Subtract remainder from latest sample to include it
                      ;in the next calculation. Save to OLD_ANG for use
                      ;in the next calculation.
    END IF
ELSE                  ; Negative trackball direction
    IF CNG_ANG <= (-RES_VAL) THEN
                      ;Test-was negative ball motion large enough to
                      ;output?
        WHILE CNG_ANG =< (-RES_VAL)
                      ;Calculate the trackball counts, - direction
            CNG_ANG = (CNG_ANG + RES_VAL)
            TRACK_CNT = (TRACK_CNT - 1)
                      ;Add 1 trackball count in negative direction
        END WHILE
    OLD_ANG = (NEW_ANG - CNG_ANG)
                      ;Subtract remainder from latest sample to include it
                      ;in the next calculation. Save to OLD_ANG for use
                      ;in the next calculation.
    END IF
END IF
SERIAL_COUNT = (SERIAL_COUNT + TRACK_CNT)
                      ;Prepare to transmit the total trackball counts
                      ;accumulated so far on the serial bus to the
                      ;Host.
TRACK_CNT = 0         ;Reset incremental trackball count to 0 after
                      ;transmission. Continue to accumulate
                      ;trackball counts.
```

The following features, functions and advantages are realized employing a position indicating device constructed and operating in accordance with the present invention.

1. Dual compartment construction. The present invention employs a first sealed compartment for electronic circuits, e.g., the magnetic angle measurement circuits including the sensors 52, 62, signal conditioners 56 and 66, and supporting microcontroller 90, and an opened compartment for mechanical circuits, e.g., the trackball 20, drive tube assemblies 30 and bearing assemblies 110–120. As such, the electronic components can be completely sealed and isolated from the mechanical components. This is particularly useful because it is often difficult (if not impossible) to seal the mechanical components within a trackball compartment, which must at least partially be exposed to permit X-axis and Y-axis movement thereof. In a conventional trackball, X-axis and Y-axis optical encoders and associated electronic components lie alongside the trackball, e.g., in at least a partially open compartment. As such, the electronic components eventually are exposed to contaminants (e.g., liquids, gases or other matter) that enter the ball compartment. In time, these conventional trackballs systems typically fail to operate correctly or become unsafe to operate.

As described herein, the ball compartment of the present invention (e.g., the opened compartment 14) includes the trackball 20, X-axis and Y-axis drive tubes 32 and 34, respectively, with an encapsulated magnet assembly 42 and 44, respectively, at one end of each drive tube, and bearing assemblies 110–120 to support the drive tubes 30 and the ball 20. Water or other flammable liquids or even explosive gasses may enter the opened compartment 14 without any loss of function or danger to the operator. In one aspect of the present invention, the position indicating device 10 operates under water with no loss in function. In dusty and dirty environments the position indicating device 10 can be cleaned (e.g., decontaminated) by immersion in a cleaning bath. In medical applications, chemicals that may adhere to the operator's hand and contaminate the ball are easily cleaned and flushed away safely. In military or other applications that include NBC (Nuclear, Biological, and Chemical) events, components of the position indicating device 10 are easily decontaminated in the open compartment 14 because removal of the sub-chassis 100 exposes a plane and simple chamber 14 without cracks or crevices. This allows for complete decontamination of the opened compartment 14 and the mechanical components disposed therein. In fact, the trackball 20, drive tube assemblies 30 and subchassis 100 can be easily decontaminated or replaced inexpensively. It should be appreciated that the bearing assemblies 110–120 may require periodic replacement as their inner surfaces may be difficult to decontaminate.

2. Sensing and measuring magnetic flux changes. Since the present invention does not use optical encoders and employs, instead, sensors and signal conditioning chips for sensing and measuring magnetic flux angle changes, the present design provides a highly reliable, high-resolution position indicating device. Conventional position indicating devices use optical encoders, typically two such encoders, one encoder for each axis (e.g., X-axis and Y-axis). The inventor has realized that the use of optical encoders in conventional position indicating devices present three problems. Firstly, a physical connection is needed to connect a drive shaft of the encoder to receive motion input. Secondly, the encoders are generally not completely sealed or liquid tight. Thirdly, the count resolution is limited for a reasonably priced device. As such, high reliability, long life encoders are relatively expensive.

The present invention uses long life bearings (e.g., bear assemblies 110–120) and two magnetic angle measurement circuits (e.g., X-axis sensor 52 and signal conditions 56, and Y-axis sensor 62 and signal conditioner 66) that are sealed in a separate compartment (e.g., sealed compartment 16) from the trackball 20, drive tube assemblies 30 and associated bearings 110–120. A magnetic field is used to transmit trackball X-axis and Y-axis coordinate data from the mechanical ball compartment (e.g., compartment 14) to the sealed electronics compartment (e.g., compartment 16).

In one embodiment, the magnetic field sensor circuit (e.g., X-axis and Y-axis sensors 52 and 62) are comprised of a dual bridge magnetoresistive device (e.g., a Phillips Semiconductor model KMZ41 sensor) that presents two out of phase signals to the signal conditioning chip (e.g., X-axis signal conditioner 56 and Y-axis signal conditioner 66) that are comprised of Philips Semiconductor model UZZ9001 chips. The signal conditioning chips use the relative difference in amplitudes of these two signals to calculate the magnetic angle. Because the relative difference in signal amplitude is used and not the absolute amplitude of signal in the calculation process, the absolute strength of the magnetic field above some nominal value is not critical. The magnetic air gap distance, e.g., the distance between the magnet in the sealed magnetic assemblies 42 and 44 on the drive tube assemblies 30 and the magnetic sensors (e.g., sensors 52 and 62) in the sealed electronics compartment 16, may cause variance of the magnetic field at the sensor. In accordance with one embodiment of the present invention, the magnetic air gap of about 0.034 to 0.25 inch (as described above) is controlled to about 0.10 inch plus or minus about ten percent (10%).

The resolution of the angle measurement system is relatively high because the signaling conditioning chips provide an angle measurement result of thirteen (13) bits. This chipset provides a published angle resolution of about 0.022 degree. By comparison, a conventional encoder would require 4096 count periods per revolution: ((360/4096)/4)= 0.022 degrees/count. An encoder with this resolution would be very expensive. By way of comparison, a 64-count encoder with a rotational life of 10,000,000 revolutions, purchased in quantities of thousands cost approximately $23.00 (USD) each. The component cost of the present angle measurement chipset in quantities of one thousand is approximately $3.50 for the UZZ9001 signal conditioning chip, about $0.85 for the KMZ41 magnetoresistive sensors, and about $0.90 for a samarium cobalt magnet (8 mm×7.5 mm×3 mm), for a total unit cost of about $5.25. In both the conventional encoder method and the present invention's magnetic angle measurement trackball, a microcontroller and associated electronics are required to serially transmit the trackball count data to a host system, e.g., an information processing system such as a computer.

3. Redundant design for critical applications. Redundant systems are preferred in critical applications that can not be interrupted in the event of a component failure. Critical application include, for example, military, medical, moving vehicle applications and/or industrial control applications. One advantage of the present invention's angle measurement method position indicating device is that a redundant system can be easily implemented. The mechanical components, including sealed bearing assemblies 110–120, drive tube assemblies 30, encapsulated magnet assemblies 42 and 44, and trackball 20 are robust and have an extremely low failure rate.

In one embodiment, complete redundancy is implemented by including in the electronics package of the sealed compartment 16 another UZZ9001 signal conditioning chip and a KMZ41 sensor chipset for each axis and another microcontroller to transmit a second serial signal to the host information processing system. In one embodiment, a circuit card is fabricated with a separate angle measurement circuit on each side of the card. In the redundant system, the magnetic sensors (e.g., sensors 52, 54, 62, 65) are placed inline with the magnetic field generated by the magnetic assemblies 42 and 44 of the drive tube assemblies 30 for each axis, e.g., X-axis drive tube 32 and Y-axis drive tube 34. It should be appreciated that the sensors that are farther away from the sealed magnet assembly of each drive tube (e.g., magnet assemblies 42 and 44) have a larger air gap. As such, there is a resulting loss in magnetic field intensity in the redundant sensors. As described above, the present invention employs relative amplitudes of two out of phase signals to calculate an angle and not on the absolute signal levels. To ensure stable operation of the redundant system, it is within the scope of the present invention to include a slightly stronger magnet assembly to be used on the drive tubes. The remaining components within the opened compartment 14 are unchanged.

While the inventive position indicating device 10 has been described and illustrated in connection with preferred embodiments, many variations and modifications, as will be evident to those skilled in this art, may be made without departing from the spirit and scope of the invention.

The invention is thus not to be limited to the precise details of methodology or construction set forth above as such variations and modification are intended to be included within the scope of the invention.

What is claimed is:

1. A position indicating device, comprising:
   a housing having a sealed compartment and an opened compartment;
   a trackball disposed in said opened compartment;
   plurality of drive tube assemblies disposed in said opened compartment for supporting a periphery of said trackball, wherein said plurality of drive tubes includes an X-axis drive tube and a Y-axis drive tube, said X-axis drive tube and said Y-axis drive tube each having a sealed magnet assembly affixed thereto such that a north-to-south pole magnetic field angle rotates as said X-axis drive tube and said Y-axis drive tube rotates;
   an X-axis angle sensor, an X-axis signal conditioner, a Y-axis magnetic angle sensor, and a Y-axis signal conditioner disposed in said sealed compartment for sensing and measuring said north-to-south pole magnetic field angle; and
   a processor disposed within said sealed compartment, said processor coupled to said sensors and signal conditioners for determining a change in consecutive magnetic field angles and for translating said change into an indication of linear motion of said position indicating device.

2. The position indicating device as set forth in claim 1, wherein said housing is comprised of stainless steel and said sealed compartment is comprised of a poured plastic potting compound encasing said sensors, said signal conditioners and said processor.

3. The position indicating device as set forth in claim 1, wherein said plurality of drive tubes includes an idler drive tube.

4. The position indicating device as set forth in claim 1, wherein a distance between said sealed magnet assembly of a drive tube and a corresponding one of said angle sensors is between about 0.034 to 0.25 inch.

5. The position indicating device as set forth in claim 1, wherein said trackball and said plurality of drive tube assemblies comprise a sub-chassis assembly.

6. The position indicating device as set forth in claim 5, further comprising a cover removably mounted over and enclosing said opened compartment, wherein when said cover is removed said sub-chassis assembly is removable from said opened compartment.

7. A position indicating device of a host device, comprising:
   a housing having a sealed compartment and an opened compartment;
   a trackball disposed in said opened compartment;
   plurality of drive tube assemblies disposed in said opened compartment for supporting a periphery of said trackball, wherein said plurality of drive tubes includes an X-axis drive tube and a Y-axis drive tube, said X-axis drive tube and said Y-axis drive tube each having a sealed magnet assembly affixed thereto such that a north-to-south pole magnetic field angle rotates as said X-axis drive tube and said Y-axis drive tube rotates;
   a first and a second X-axis angle sensor, a first and a second X-axis signal conditioner, a first and a second Y-axis magnetic angle sensor, and a first and a second Y-axis signal conditioner disposed in said sealed compartment for sensing and measuring said north-to-south pole magnetic field angle; and
   a first and a second processor disposed within said sealed compartment, said first processor coupled to said first sensors and first signal conditioners and said second processor coupled to said first sensors and first signal conditioners, said first and said second processors for determining a change in consecutive magnetic field angles, for translating said change into a first and a second indication of linear motion of said position indicating device, and for transmitting a first and a second signal including said first and said second respective indications to said host device.

8. A method for determining linear motion of a position indicating device for positioning a cursor on a display device, comprising:
   providing a housing having an opened compartment and a sealed compartment;
   locating a trackball, an X-axis and a Y-axis drive tube assembly in the opened compartment;
   affixing a sealed magnet assembly to each of the X-axis and Y-axis drive tube assemblies;
   locating and electrically coupling an X-axis angle sensor, a Y-axis angle sensor and a processor in the sealed compartment;
   generating, with the sealed magnet assemblies, north-to-south pole magnetic field angles as the X-axis and Y-axis drive tubes rotate in response to movement of the trackball;
   sensing, with the X-axis and Y-axis angle sensors, X-axis and Y-axis magnetic field angles and providing the sensed field angles to the processor;
   determining, with the processor, a change in consecutive magnetic field angles and translating the change into an indication of linear motion of the trackball; and
   transmitting the indication to the display device for positioning the cursor.

* * * * *